(12) United States Patent
Nayak (10) Patent No.: US 9,378,105 B2
(45) Date of Patent: Jun. 28, 2016

(54) SYSTEM AND METHOD FOR OPTIMIZING REPLICATION

(75) Inventor: Yatin Nayak, Sunnyvale, CA (US)

(73) Assignee: Veritas Technologies LLC, Mountain View, CA (US)

(*) Notice: Subject to any disclaimer, the term of this patent is extended or adjusted under 35 U.S.C. 154(b) by 1066 days.

(21) Appl. No.: 12/965,256

(22) Filed: Dec. 10, 2010

(65) Prior Publication Data

US 2012/0151164 A1 Jun. 14, 2012

(51) Int. Cl.
*G06F 12/00* (2006.01)
*G06F 11/20* (2006.01)

(52) U.S. Cl.
CPC ........ *G06F 11/2094* (2013.01); *G06F 11/2097* (2013.01)

(58) Field of Classification Search
USPC ........................................ 711/161
See application file for complete search history.

(56) References Cited

U.S. PATENT DOCUMENTS 8,924,352 B1 * 12/2014 Andruss et al. ............... 707/640
2008/0072000 A1 * 3/2008 Osaki ................... G06F 11/1662
711/162

* cited by examiner

*Primary Examiner* — Matthew Bradley
(74) *Attorney, Agent, or Firm* — Wilmer Cutler Pickering Hale and Dorr LLP (57) ABSTRACT

Embodiments of the present invention are directed to a method and system for optimizing replication within a storage system utilizing multiple tiers by using tier-specific replication modes. The method includes receiving, within an electronic system having a plurality of tiers, an access request for a portion of storage associated with a first tier of the plurality of tiers and accessing a replication attribute corresponding to the first tier and also corresponding to a replication mode. The method further includes sending the access request to the portion of storage; and replicating the access request to a remote storage wherein the replicating is based on the replication mode and wherein each of the plurality of tiers have associated therewith a respective replication attribute defining a respective replication mode.

20 Claims, 8 Drawing Sheets

SYSTEM AND METHOD FOR OPTIMIZING REPLICATION

FIELD OF THE INVENTION

Embodiments of the present invention are generally related to digital computer systems and digital storage.

BACKGROUND OF THE INVENTION

As technology advances, data storage is becoming increasingly important and data storage capacities are increasing rapidly. Correspondingly, the size of data storage arrays and their demands for storage have increased rapidly. Ever increasing amounts of data are required to be highly available and protected from corruption or damage that may be caused by any of a variety of factors, such as natural disasters and power failures, etc. As a result, increasingly complex data storage clusters are used to satisfy the demands for data storage and retrieval. The data related to these storage clusters are routinely backed up to prevent data loss.

In order to ensure the ability to keep operating after a disaster, all data of a local site may be replicated to one or more remote site(s). The replication of the local data to remote sites can consume large amounts of bandwidth and require identical amounts of storage at the remote site. The storage costs are thus proportional to each remote site thereby making the practice of maintaining multiple remote sites particularly costly. Replication can thus be expensive both in terms of resources and bandwidth. Unfortunately, since all the data is replicated to the remote site(s), both important and unimportant data is copied. This results in the unfortunate need for storage and bandwidth to store and transmit data that is of reduced or little importance.

Thus, a need exists to more efficiently replicate data while reducing bandwidth and storage requirements at remote sites.

SUMMARY OF THE INVENTION

Accordingly, embodiments of the present invention provide a system and method for optimizing replication. In one embodiment, replication is optimized by selectively performing replication based on tier-specific replication modes assigned to the tiers of a multi-tier storage system thereby saving bandwidth and reducing storage requirements at one or more remote sites. Embodiments of the present invention are operable to distinguish the relative priorities of tiers of storage and thereby exclude non-critical data from replication and/or modify replication modes associated with the data. The tier-specific replication modes can be assigned by the user and/or they can be automatically determined within various embodiments of the present invention. Once the tier-specific replication modes are defined, the replication performed for each tier can be different, e.g., providing increased security and guarantee for high priority tiers and lower quality replication for lower priority tiers, etc.

In one embodiment, the present invention is implemented as a method for optimizing replication. The method includes receiving, within an electronic system having a plurality of tiers, an access request for a portion of storage associated with a first tier of the plurality of tiers and accessing a replication attribute corresponding to the first tier and also corresponding to a replication mode. The method further includes sending the access request to the portion of storage; and replicating the access request to a remote storage wherein the replicating is based on the replication mode and wherein each of the plurality of tiers have associated therewith a respective replication attribute defining a respective replication mode. The replication mode can include sending an acknowledgement to an application after the access request is completed on the remote storage or sending an acknowledgement after the access request is sent to the remote storage. The replication mode can also include sending an acknowledgement while a size of the access request and a plurality of previous access requests are less than a predetermined size limit or excluding the portion of storage from replication on the remote storage.

The method can further include accessing a file placement policy associated with the plurality of tiers and automatically determining a respective replication mode for each of the plurality of tiers based on the file placement policy. The automatically determining can including examining the numbers of files that are associated with each tier of the plurality of tiers. Respective replication attributes can then be associated with each tier of the plurality of tiers based on a determined respective replication mode for each tier.

In another embodiment, the present invention is implemented as a non-transitory computer readable storage medium having stored thereon, computer executable instructions that, if executed by a computer system cause the computer system to perform a method including includes receiving, within an electronic system having a plurality of tiers, an access request for a portion of storage associated with a first tier of the plurality of tiers and accessing a replication attribute corresponding to the first tier and also corresponding to a replication mode. The method further includes sending the access request to the portion of storage; and replicating the access request to a remote storage wherein the replicating is based on the replication mode and wherein each of the plurality of tiers have associated therewith a respective replication attribute defining a respective replication mode. The replication mode can include sending an acknowledgement to an application after the access request is completed on the remote storage or sending an acknowledgement after the access request is sent to the remote storage. The replication mode can also include sending an acknowledgement while a size of the access request and a plurality of previous access requests are less than a predetermined size limit or excluding the portion of storage from replication on the remote storage.

The method can further include accessing a file placement policy associated with the plurality of tiers and automatically determining a respective replication mode for each of the plurality of tiers based on the file placement policy. The automatically determining can including examining the numbers of files that are associated with each tier of the plurality of tiers. Respective replication attributes can then be associated with each tier of the plurality of tiers based on a determined respective replication mode for each tier.

In yet another embodiment, the present invention is implemented as a storage system comprising a computer system having one or more processors coupled to a computer readable storage media and executing computer readable code which causes the computer system to implement a process including accessing information related to the plurality of tiers and based on the information, associating a respective replication mode with each tier of the plurality of tiers. The method further includes storing each respective replication mode associated with each tier and responsive to an access request to a first tier of the plurality of tiers, accessing a first replication mode associated with the first tier to initiate a replication function specified by the first replication mode for the access request. The first replication mode may be selected from the set comprising hard synchronous mode, soft synchronous mode, asynchronous mode, and no replication mode.

The information related to the plurality of tiers may be user specified. In one embodiment, the information related to the plurality of tiers comprises a file placement policy associated with the plurality of tiers and the associating a respective replication mode with each tier includes accessing the file placement policy and automatically determining a respective replication mode for each tier of the plurality of tiers based on the file placement policy. A respective replication mode may then be associated with each tier of the plurality of tiers based on the automatically determining. The automatically determining may include determining numbers of files associated with each tier of the plurality of tiers. The automatically determining may further include determining the age of files or the file extensions (e.g., suffixes) associated with each tier of the plurality of tiers. The method may further comprise rendering a graphical user interface or command-line interface in which respective replication modes associated with the plurality of tiers are user modifiable and presentable to the user.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

Figure 1:
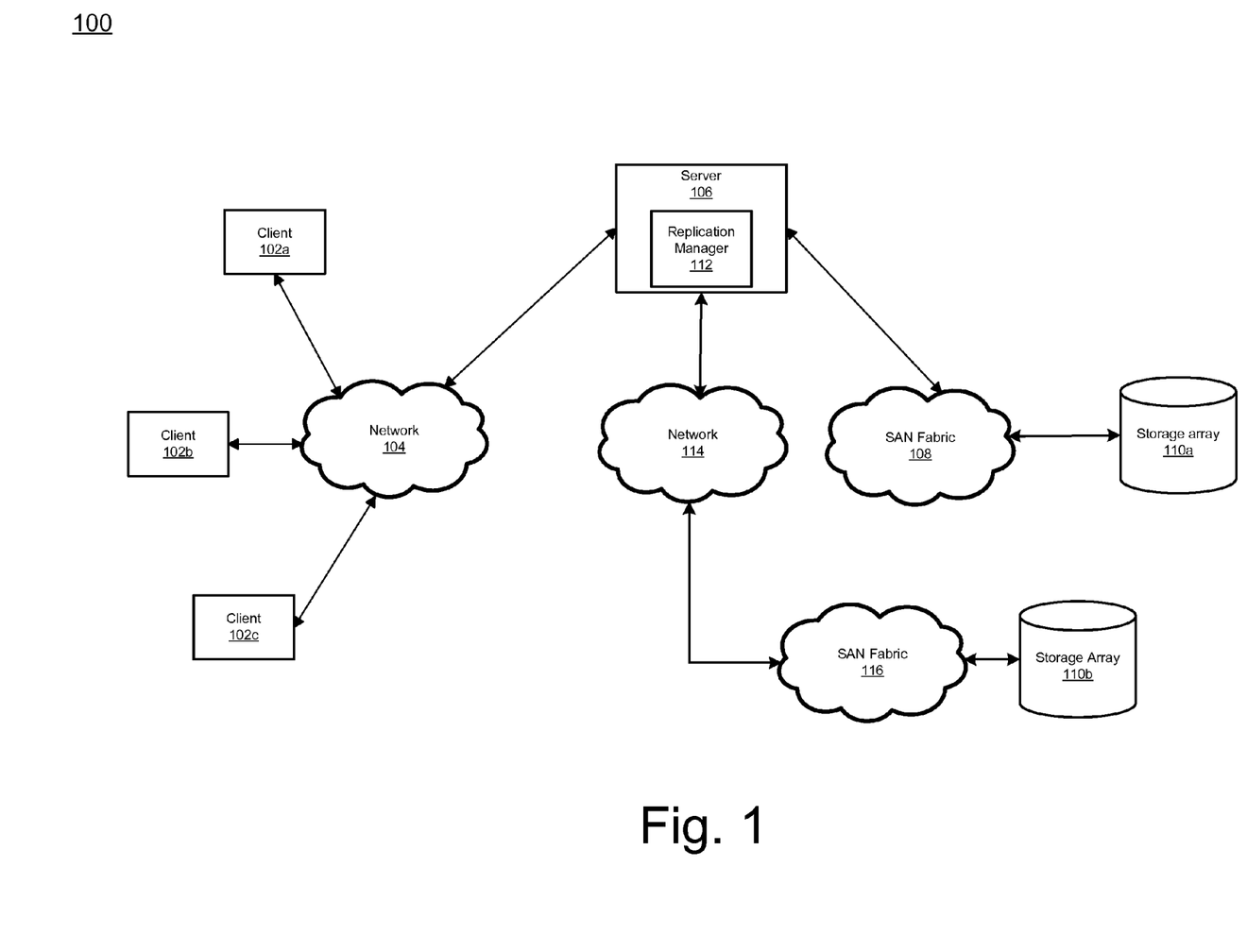
FIG. 1 shows a block diagram of an exemplary operating environment, in accordance with one embodiment of the present invention.

FIG. 1 shows a block diagram of an exemplary operating environment, in accordance with one embodiment of the present invention. Exemplary operating environment 100 includes clients 102a-c, networks 104 and 114, server 106, storage area network (SAN) fabrics 108 and 116, and storage arrays 110a-b. It is appreciated that the components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via server 106 using, for example, a web browser or other suitable client communication software (not shown). Server 106 performs requests received from clients 102a-c. FIG. 1 depicts the use of networks 104 and 114 such as the Internet for exchanging data, but the present disclosure is not limited to the Internet or any particular network-based environment.

Server 106 can have multiple clients (e.g., clients 102a-c) connected thereto. Server 106 can provide access to data for various types of applications including, but not limited to, database servers, network file system (NFS) servers, and application servers (e.g., billing). For example, applications and servers might have thousands of people accessing them from different locations, thus the applications and servers need to be highly available and the cluster fault tolerant. Server 106 may be linked to storage array 110a in a variety of ways including, fibre channel.

Server 106 executes replication manager 112 which optimizes replication of data of storage array 110a to storage array 110b. Replication manager 112 communicates with storage array 110b via network 114 and SAN fabric 116. Storage array 110b and SAN fabric 116 may be located at a location remote from server 106 (e.g., at an offsite location). Replication manager 112 optimizes replication by selectively replicating portions of storage array 110a to storage array 110b.

Figure 2:
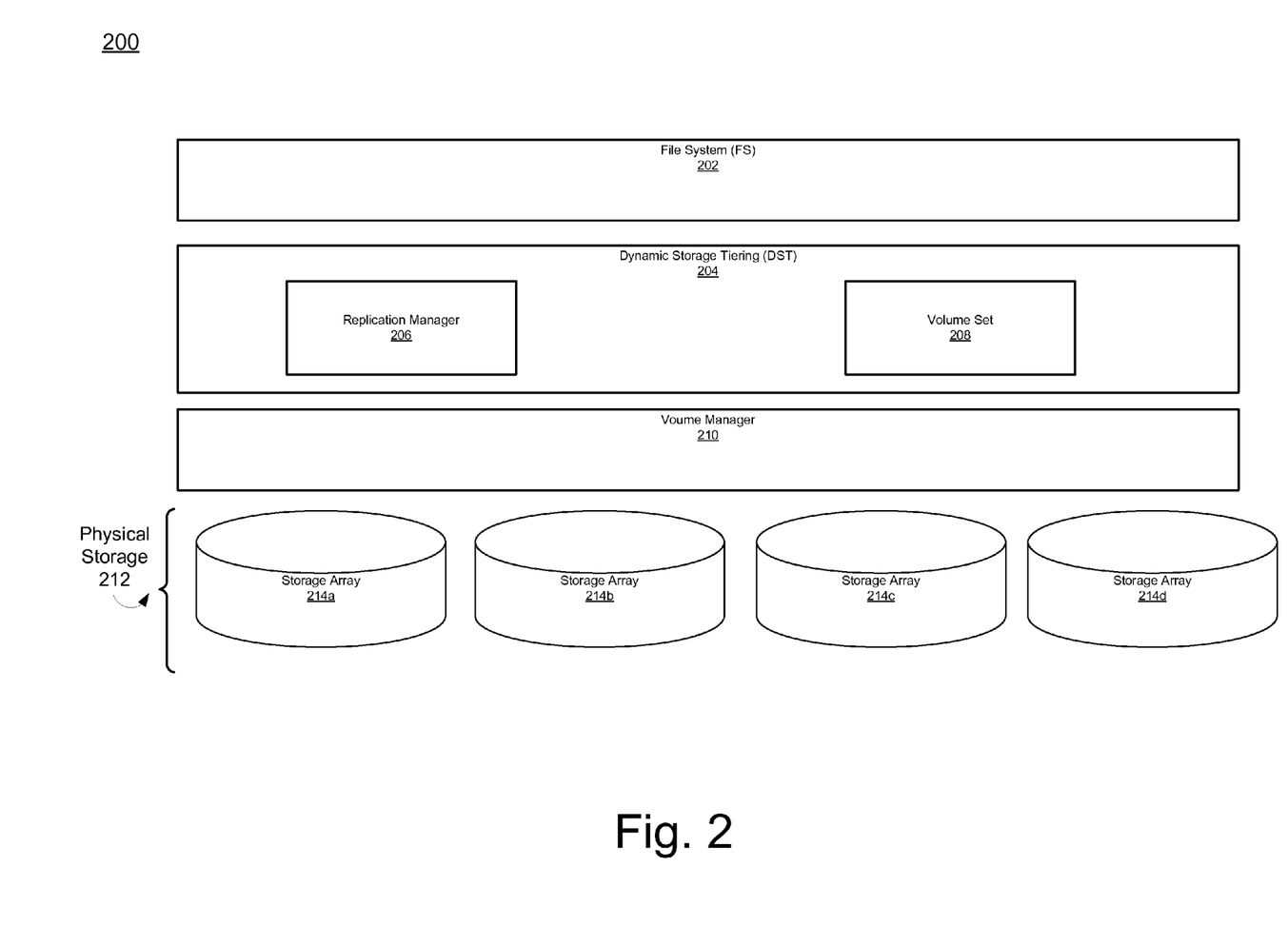
FIG. 2 shows a block diagram of exemplary storage access layers, in accordance with one embodiment of the present invention.

Exemplary Systems and Methods for Optimized Replication Based on Tier-Specific Replication Modes FIG. 2 shows a block diagram of exemplary storage access layers, in accordance with one embodiment of the present invention. Diagram 200 includes file system (FS) layer 202, dynamic storage tiering (DST) layer 204, volume manager layer 210, and physical storage 212. In accordance with embodiments of the present invention, replication modes can be associated with each different tier defined within the DST layer 204 thereby allowing tiers to be replicated differently, e.g., based on the level of importance of the data within each tier.

File system 202 provides file system functionality (e.g., organizes files for the storage, organization, manipulation, and retrieval by a computer's operating system) to programs executing on a computer system (e.g., server 106). Access requests received by the file system (e.g., from applications or the operating system) are sent to dynamic storage tiering layer 204.

In one exemplary embodiment, dynamic storage tiering layer 204 includes replication manager 206 and volume set 208. In another embodiment, replication manager 206 may be part of file system 202 or be a separate layer or module. Dynamic storage tiering layer 204 allows users to create multiple storage tiers for the volume. Dynamic storage tiering layer 204 allows creation of tiers which include one or more volumes. Dynamic storage tiering layer 204 allows a user to specify which volumes are in a tier and configure one or more tiers which make up a tier set. The volumes of each tier may be selected and configured based on each volume having similar performance and/or redundancy characteristics, but could alternatively be configured according to any user preference. In accordance with embodiments of the present invention, respective replication modes can be associated with the tiers such that each tier has its own replication mode.

Volume set 208 includes one or more volumes of a tier set corresponding to storage having a variety of redundancy and performance characteristics. Replication manager 206 manages replication of data in volume set 208 to a remote (e.g., secondary) site, or multiple sites, for disaster recovery, for instance. Replication manager 206 processes access requests to ensure that data access requests (e.g., read and write requests) are performed and replicated to one or more remote sites. As described further below, in accordance with embodiments of the present invention, replication manager 206 determines the currently assigned replication mode for a given tier in order to perform any replication involving that tier. Dynamic storage tiering layer 204 sends the data access request to volume manager 210.

Volume manager 210 controls the creation of volumes which make up volume set 208 and volume manager 210 provides data access requests to physical storage 212. In one embodiment, physical storage 212 includes storage arrays 214a-d which store data for volume set 208. Storage arrays 214a-d may have various performance and redundancy characteristics which are used in the setup of the volumes of volume set 208.

Figure 3:
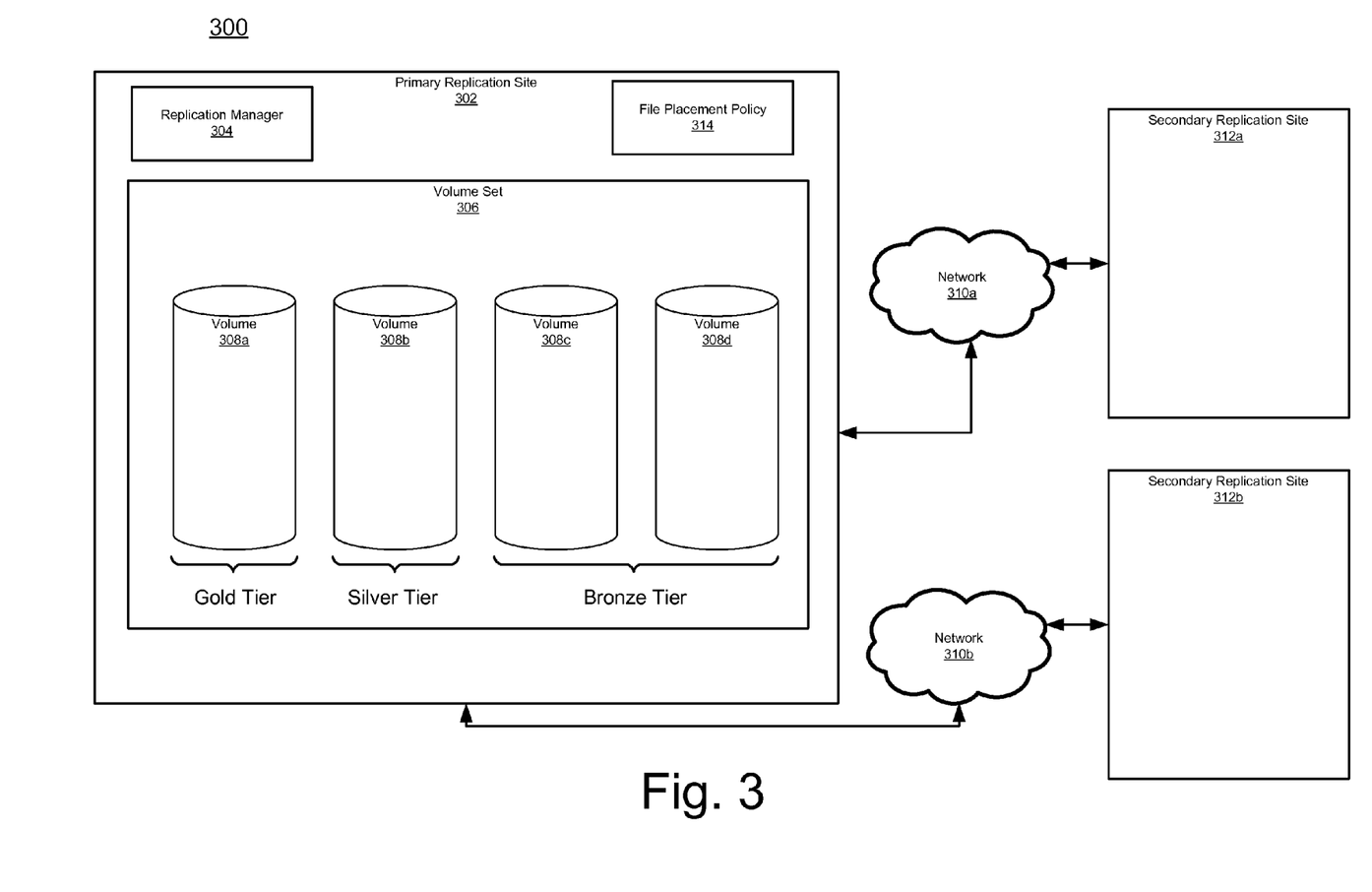
FIG. 3 shows a block diagram of exemplary primary and secondary replication sites, in accordance with one embodiment of the present invention.

FIG. 3 shows a block diagram of exemplary primary and secondary replication sites, in accordance with one embodiment of the present invention. System 300 is exemplary and includes primary replication site 302 and secondary replication sites 312a-b. It is appreciated that embodiments of the present invention support replication to single and multiple remote sites.

Primary replication site 302 includes replication manager 304 and volume set 306 (e.g., both of a dynamic storage tiering layer 204). Primary replication site 302 is communicatively coupled to secondary replication sites 312a-b via networks 310a-b. Networks 310a-b may be of a variety of well known network types including a metropolitan area network (MAN), local area network (LAN), or wide area network (WAN), etc. Replication manager 304 manages and optimizes the replication of volume set 306 to secondary replication sites 312a-b. Because tier-specific replication modes can be assigned to the tiers, and these replication modes can exclude replication for one or more tiers, embodiments of the present invention allow replication to remote sites having less storage than primary replication site 302.

In this example, volume 308a may be enterprise grade storage with high performance (e.g., increased Input/Output Operations Per Second IOPS, solid-state drives (SSDs), etc.) and redundancy (e.g., redundant arrays of inexpensive disks (RAID), etc). Volume 308b may be storage that is less expensive than that of volume 308a but still has better characteristics than volumes 308c-d. Volumes 308c-d may be the least expensive storage relative to the storage of volumes 308a-b and have corresponding performance and redundancy features less than volumes 308a-b. For example, volumes 308c-d may have few performance characteristics and no redundancy (e.g., Just a Bunch Of Disks (JBOD)).

Volumes 308a-d may be assigned a rating or label corresponding to the class of storage (e.g., performance, redundancy, and cost). In one embodiment, volume 308a may be part of a user-defined "gold tier" corresponding to high performance and redundancy. Volume 308b may be part of a user defined "silver tier" corresponding to less performance and/or redundancy than the gold tier. Volumes 308c-d may be part of a user defined "bronze tier" corresponding to less performance and/or redundancy than both the gold tier and the silver tier. In this example, each tier, of gold, silver and bronze, has associated therewith a respective duplication mode ranging from highest guarantee to lowest guarantee (or not duplicated at all). Replication manager 304 may thus provide better levels of replication service (e.g., replication guarantees) for the more important data residing in the gold and silver tiers.

Embodiments of the present invention replicate data in volumes 308a-d based on tier specific replication modes that may be based on the importance or priority of the data. For example, database tables may be stored on volume 308a while redo logs or temp files corresponding to the database tables may be stored on the less expensive volumes 308b-d. Replication manager 304 is operable to replicate higher priority data with increased guarantee replication modes (e.g., stored in volume 308a) and adjust replication modes or not replicate lower priority data (e.g., stored in volumes 308c-d). The replication modes are tier-specific within embodiments of the present invention and may be manually set by the user for a specific tier or may be automatically determined or both.

Volume set 306 is replicated to secondary replication sites 312a-b (e.g., offsite or remote locations) so that in the event of a disaster or other failure, a copy of volume set 306 at secondary replication sites 312a-b may be mounted and used to continue operations. Replication sites 312a-b may thus have identical volume sets and storage tier hierarchy. In one embodiment, when secondary replication sites 312a-b are set up the replication attributes are copied from volume set 306.

In one embodiment, replication manager 304 replicates portions of volume set 306 to secondary replication sites 312a. For example, replication manager 304 may replicate data from volumes 308a-c, excluding volume 308d, which replicates data sufficient that volume 308d could be rebuilt from the replicated data of volumes 308a-c. Replication manager 304 may access a user configurable replication attribute to determine whether to exclude any volumes from replication. Replication manager 304 may present a plurality of volumes (e.g., volume set 306) or specific portions of a volume and receive a selection of a volume, volumes, or portions of a volume that are to be excluded from replication via a graphical user interface (GUI) or command line interface (CLI). A user may then configure each respective replication mode for each tier and modify recommended replication modes via the GUI or CLI.

It is appreciated that replication modes may be associated with each tier of volume set 306 by using a respective replication attribute associated with each tier. The attribute for a given tier can be associated, e.g., stored, with the tier as a tier parameter. Each tier may include multiple volumes. Therefore, the replication mode for each tier or volume may be stored as a replication attribute or tag associated with each volume. The replication attribute for each tier is accessible by replication manager 304 in performing replication of portions of volume set 306 to secondary replication sites 312a-b. Replication manager 304 may thus perform updates to data on lesser priority tiers (e.g., volume 308d) while sending out updates for data of volumes 308a-c for replication to secondary replication sites 312a-b.

Replication manager 304 may assign different replication guarantees based on the replication modes. The replication guarantees are carried out by various replication modes, as described herein. For instance, embodiments of the present invention may utilize the following replication modes: hard synchronous; soft synchronous; asynchronous; and no replication. These different replication modes can be assigned to each different tier of the system. In one embodiment, a GUI can be employed to allow a user to manually assign/update the different replication modes to the various tiers.

In another exemplary embodiment, replication manager 304 automatically determines replication modes for each tier based on an analysis of a file placement policy 314 associated with the tiers. Specifically, the determination may be based on the types of files that are stored in each tier. File placement policy 314 may include policies for which types of files (e.g., database files) are to be located in each tier. File placement policy 314 allows control on the placement of the data on each of these tiers, based on specific file placement policies as chosen or created by the user. The policies of file placement policy 314 may be configured by a user (e.g., via a GUI) or precreated. For example, a policy of file placement policy 314 may indicate that files with a ".dat" extension are to be stored in volume 308a or a gold tier. The file policy placement may be stored in an Extensible Markup Language (XML) format. Therefore, the replication manager 304 may automatically determine a replication mode for a tier by examining the file types that are associated with the tier as specified by file placement policy 314.

In yet another exemplary embodiment, replication manager 304 automatically determines replication modes for each tier based on an analysis of the file placement policy 314 associated with the tiers, specifically, the determination may be based on the number, age, or file extensions of files that are stored in each tier. Replication manager 304 may examine the storage destination in the policies of file placement policy 314 in order to determine the replication mode for a given tier. In this example, the less the number of times a tier name appears in the destination part of file placement policy 314, the less important the tier may be by virtue of it being the least accessed tier. Alternatively, the more times a tier appears as a destination the more important the tier can be considered.

For instance, the replication manager 304 may automatically examine the placement policy 314 to determine that a first tier is listed as a data destination for many files. Therefore, the replication manager 304 will assign this first tier with a high quality replication mode to ensure that all data is secure. Alternatively, the replication manager 304 may determine that few files are associated with a second tier, and may assign a lesser quality duplication mode with that tier.

Similarly, replication manager 304 may check the overall logic in the placement policy to see if transitive rules apply, e.g., if a tier dependency cycle is detected, the other policies could be deduced as well.

Independent of the file placement policy, replication manager may also automatically determine replication modes for different tiers based on the usage of the tiers. For instance, replication manager 304 may also determine that a tier contains important data based on the frequency of access of data on the tier. For example, a frequently accessed tier may be assigned a replication attribute for a high quality replication mode (e.g., hard or soft synchronous) while a tier that contains least frequently accessed data may be assigned a lower quality replication mode (e.g., asynchronous mode or excluded from replication all together).

Embodiments of the present invention that provide for automatic tier-specific replication modes may offer the user a GUI in which these replication modes can be 1) presented and 2) user modified. In this sense, automatically determined replication modes may be more accurately expressed as replication "suggestions" or "recommendations" to the user.

Figure 4:
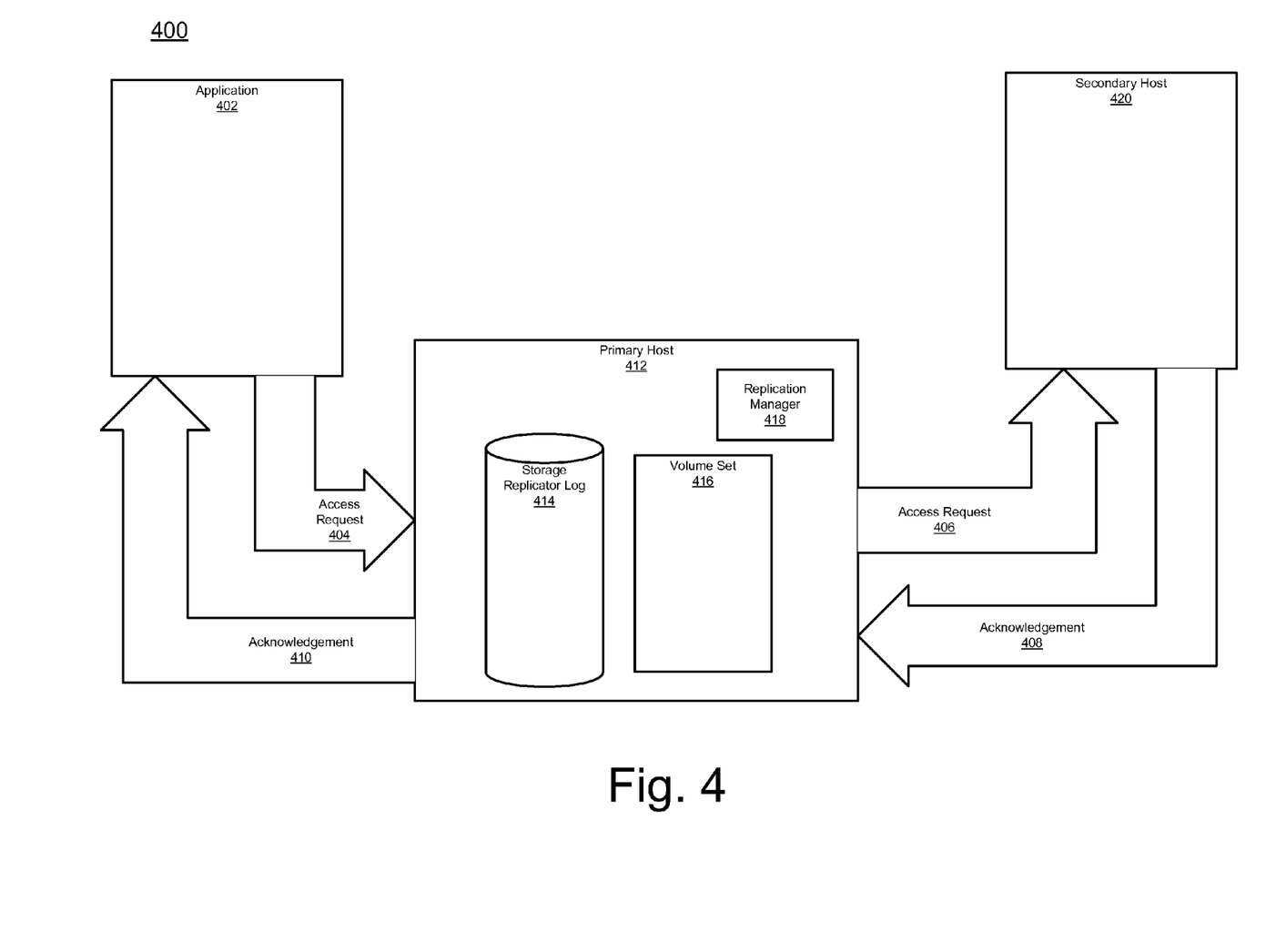
FIG. 4 shows a block diagram of an exemplary data flow, in accordance with an embodiment of the present invention.

FIG. 4 shows a block diagram of an exemplary data flow, in accordance with an embodiment of the present invention. Diagram 400 is used to explain the operation of the different types of replication modes that can be assigned to the various tiers, in accordance with embodiments of the present invention. Diagram 400 includes application 402, primary host 412, and secondary host 420. Primary host 412 may be a server (e.g., server 106) is operable to execute a replication manager 418. Secondary host 420 may be at a location remote from primary host 412. Primary host 412 executes replication manager 418 which is operable to manage replication of volume set 416 to secondary host 420 based on a plurality of replication modes.

Application 402 may be a variety of software programs including an operating system, application (e.g., database application), or file system. Application 402 sends access request 404 (e.g., read or write request) to primary host 412. Replication manager 418 receives access request 404 and sends access request 404 to storage replicator log 414. Access request 404 is stored in storage replication log 414 to allow recovery of access request 404 in the event of a failure. Replication manager 418 then sends access request 404 to volume set 416 and to secondary host 420 as access request 406. In one embodiment, access request 404 is sent to volume set 416 in parallel with access request 406 being sent to secondary host 420.

Replication manager 418 is operable to control the guarantees of replication of each access request 404 received from program 402 based on a specified replication mode assigned to each tier, which may be expressed as a replication attribute associated with the tier. In one embodiment, the different replication modes may include: hard synchronous mode; soft synchronous mode; asynchronous mode; or no replication at all. These modes may be assigned to each tier. Replication manager 418 may implement a "hard synchronous" mode for data, of so marked tiers, having an increased priority such that the data on primary host 412 and secondary host 420 is the same at any point in time. For replication of data in tiers marked as having a hard synchronous mode, acknowledgement 410 is sent to program 402 after replication manager 418 has received acknowledgement 408 (e.g., a network and data write acknowledgement) from secondary host 420 that access request 406 has completed successful. In one embodiment, hard synchronous mode is used for replication of data associated with a gold tier, for instance.

Replication manager 418 is further operable to implement a "soft synchronous" or controlled latency mode, for so marked tiers. For replication of data in tiers marked as having a soft synchronous mode, a predetermined number of access requests are allowed to be in progress on secondary host 420 before replication manager 418 suspends sending of acknowledgements to application 402. For example, the predetermined limit may be 100 megabytes of write requests or 5 minutes worth write requests may be in process with secondary host 420 before replication manager 418 suspends sending acknowledgements for write requests to program 402. The predetermined limit may be predefined or be a user configurable option. In one embodiment, replication manager 418 is operable to receive input from a user or automatically determine the recommended limit. In one embodiment, soft synchronous mode is used for replication of data associated with a silver tier, for instance.

Replication manager 418 is further operable to implement an asynchronous mode for so marked tiers. For replication of data in tiers marked as having an asynchronous mode, replication manager 418 sends access request 404 to storage replicator log 414 and sends acknowledgement 410 to program 402. Asynchronous mode thus allows data of secondary host 420 to be behind primary host 412 in time. For example, asynchronous mode may be used for data that is not essential for recovery or of reduced importance relative to gold and silver tiers (e.g., a bronze tier). Replication manager 304 may also set the replication mode for the most read tier to asynchronous mode replication to further optimize performance and replication.

For example, synchronous mode of replication may be imposed for the highest storage tier (e.g., gold tier) and asynchronous mode of replication for the lower storage tiers which would imply that the highest storage tier on the remote sites always have the latest, up-to-date application data. Moreover, the replication manager 418 may also assign a replication mode to a tier that specifies that the tier is not replicated at all.

Replication manager 418 may further support replicated volume groups. A replicated volume group (RVG) is a group of volumes corresponding to an application which are logically replicated over to a remote site. Replication manager 418 will guarantee that any ordering of access requests to volumes of the RVG will be replicated in the exact order on secondary host 420 (e.g., write order fidelity). This ensures that the data at any point in time on secondary host 420 will be consistent with the data on primary host 412 (e.g., applied in the same order). Secondary host 420 can thus be behind in time but has consistency guarantees.

Figure 5:
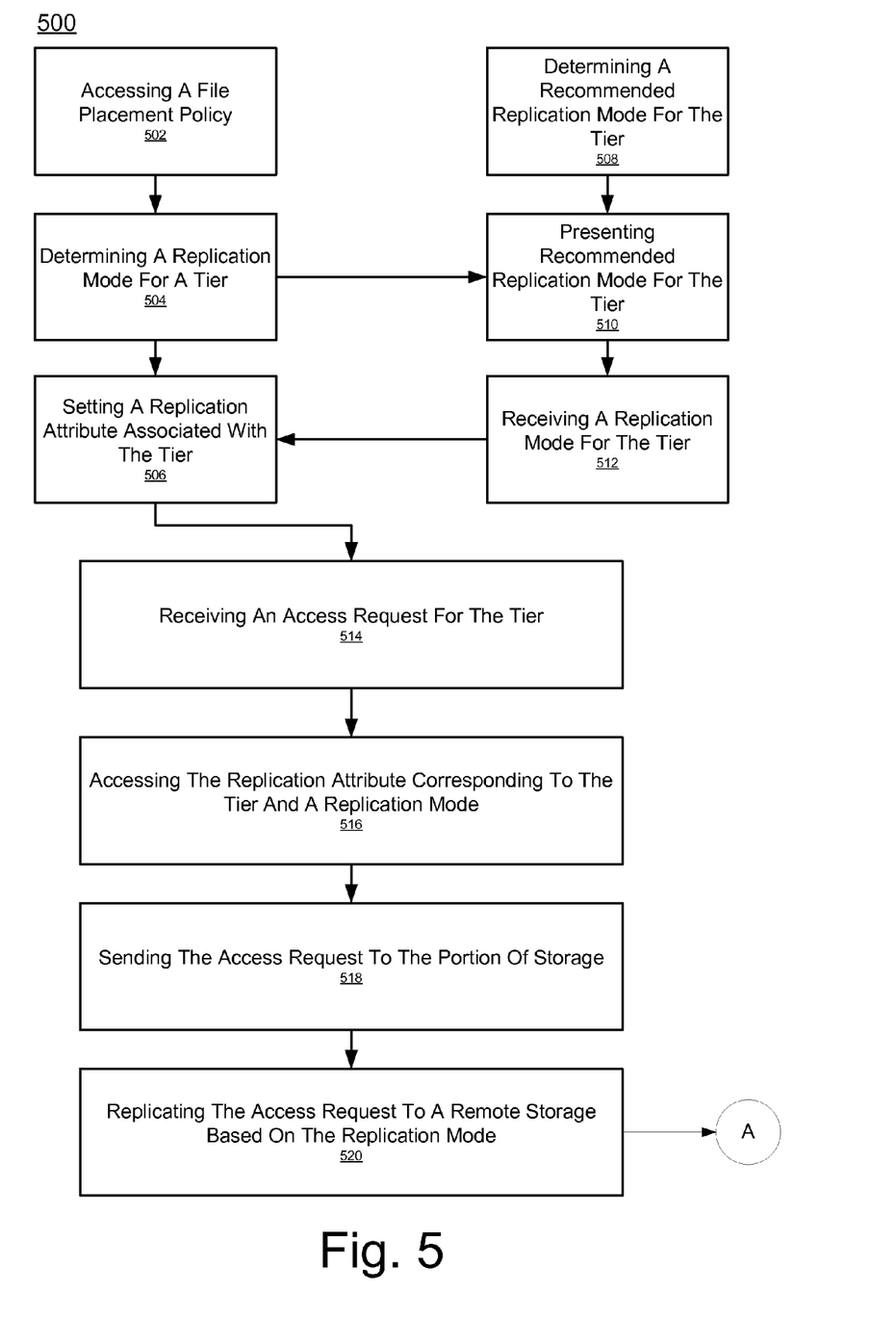
FIG. 5 shows an exemplary flowchart of a computer controlled process for performing replication, in accordance with embodiments of the present invention.
Figure 6:
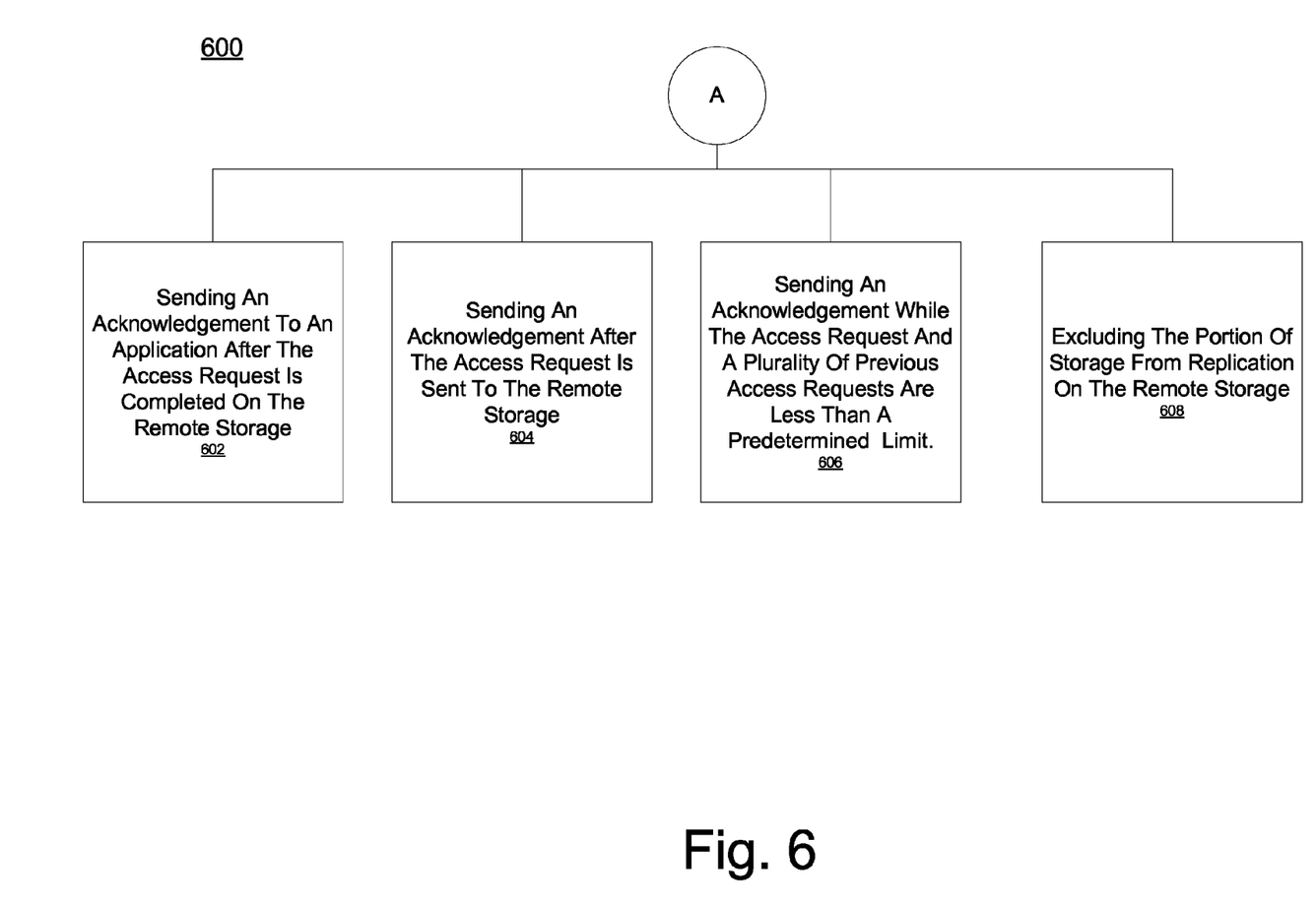
FIG. 6 shows an exemplary flowchart of a computer controlled process for performing replication in a plurality of replication modes, in accordance with embodiments of the present invention.

With reference to FIGS. 5-6, exemplary flowcharts 500-600 illustrates example computer controlled processes used by various embodiments of the present invention. Although specific blocks are disclosed in flowcharts 500-600, such blocks are exemplary. That is, embodiments are well suited to performing various other blocks or variations of the blocks recited in flowcharts 500-600. It is appreciated that the blocks in flowcharts 500-600 may be performed in an order different than presented, and that not all of the blocks in flowcharts 500-600 may be performed. Flowcharts 500-600 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 5 shows an exemplary flowchart of a computer controlled process for performing replication, in accordance with embodiments of the present invention. Process 500 may be performed by a replication manager (e.g., replication manager 112).

At block 502, a file placement policy associated with various tiers is accessed. As described herein, the file placement policy may contain policies for which files are to be located on a volume or storage tier. The file placement policy may include user defined or predefined file placement policies. These definitions may be used for specifying a replication mode for a given tier.

At block 504, a replication mode based on the file placement policy is automatically determined for each tier. Possible replication modes that can be assigned to a tier include: hard synchronous; soft synchronous; asynchronous; or no replication at all. In one embodiment, the determination of the replication mode for a given tier is based on specifications within the file placement policy that involve each tier. For instance, the replication modes may be determined based on the number of files within a given tier. Also, the replication modes may be determined based on the types of files stored in each tier. As described herein, the replication mode may also be determined based on the transitive properties or other processing of the rules in the file placement policy. Block 510 or Block 506 may then be performed.

At block 506, a respective replication attribute is set for each tier that corresponds to the tier's replication mode. As described herein, the replication attribute for a tier may correspond to a parameter associated with the tier. Alternatively, attributes may also be associated with other data portions, e.g., a file, a file type, a volume, a storage tier, or the like. In one embodiment, the data portion is a tier.

Alternatively, at block 508, a recommended replication mode for a tier may be automatically determined based on the usage of the tier, and not based on information from the file placement policy. As described herein, the recommended replication mode may be based on the access frequency of files of a storage tier. Possible replication modes that can be assigned to a tier include: hard synchronous; soft synchronous; asynchronous; or no replication at all.

At block 510, the recommended tier-specific replication modes of the tiers are presented to a user. As described herein, the recommended tier-specific replication modes may be presented via a CLI or GUI in which the user can accept or modify the replication modes for the given tiers. Alternatively, the user, at block 510, can use the GUI to specify the tier-specific replication modes for the tiers, bypassing any automatically determined modes.

At block 512, the replication modes for the tiers are received. The received replication modes may have been received via a GUI or CLI. Block 506 may then be performed to store the replication modes, e.g., via replication attributes, associated with the storage tiers.

Blocks 514-520 describe the ways in which the replication manager handles an access request involving data of a storage tier for which a replication mode has been established, in accordance with embodiments of the present invention.

At block 514, an access request for the tier is received. As described herein, the access request may be a read or write request for data associated with the tier.

At block 516, a replication attribute associated with the tier is accessed. This attribute may be located within a parameter set established for the tier. As described herein, the replication attribute corresponds to the tier and its replication mode.

At block 518, the access request is sent to the tier. The access request may then be performed on the portion of storage.

At block 520, the access request is replicated to a remote storage. As described herein, the replication is performed based on the specific replication mode associated with the tier. The different replication types available, in accordance with one embodiment of the present invention, are described herein with respect to process 600.

FIG. 6 shows an exemplary flowchart of a computer controlled process for performing replication in a plurality of replication modes, based on a tier-specific replication mode in accordance with embodiments of the present invention. Process 600 may be performed by a replication manager (e.g., replication manager 112).

Block 602 is performed for replication of tiers specified for hard synchronous replication mode. At block 602, an acknowledgement is sent to an application after the access request is completed on the remote storage. As described herein, an acknowledgement may be sent only after the access request has been performed on the remote storage for a hard synchronous replication mode.

Block 604 is performed for replication of tiers specified for asynchronous replication mode. At block 604, an acknowledgement is sent after the access request is sent to the remote storage. As described herein, an asynchronous replication mode includes sending an acknowledgement to an application upon sending the access request to the remote storage.

Block 606 is performed for replication of tiers specified for soft synchronous replication mode. At block 606, an acknowledgement is sent while a size of the access request and a plurality of previous access requests are less than a predetermined size limit. A predetermined number of requests limit may also be used based on a number of access requests sent to remote storage that have yet to be completed. As described herein, a soft synchronous replication mode includes sending an acknowledgement while the number of pending requests or the size of the pending requests is less than a predetermined limit.

Block 608 is performed for replication of tiers specified to be excluded from replication. At block 608, the portion of storage is excluded from replication on the remote storage. As described herein, portions of storage may be excluded from replication automatically or based on user settings.

Figure 7:
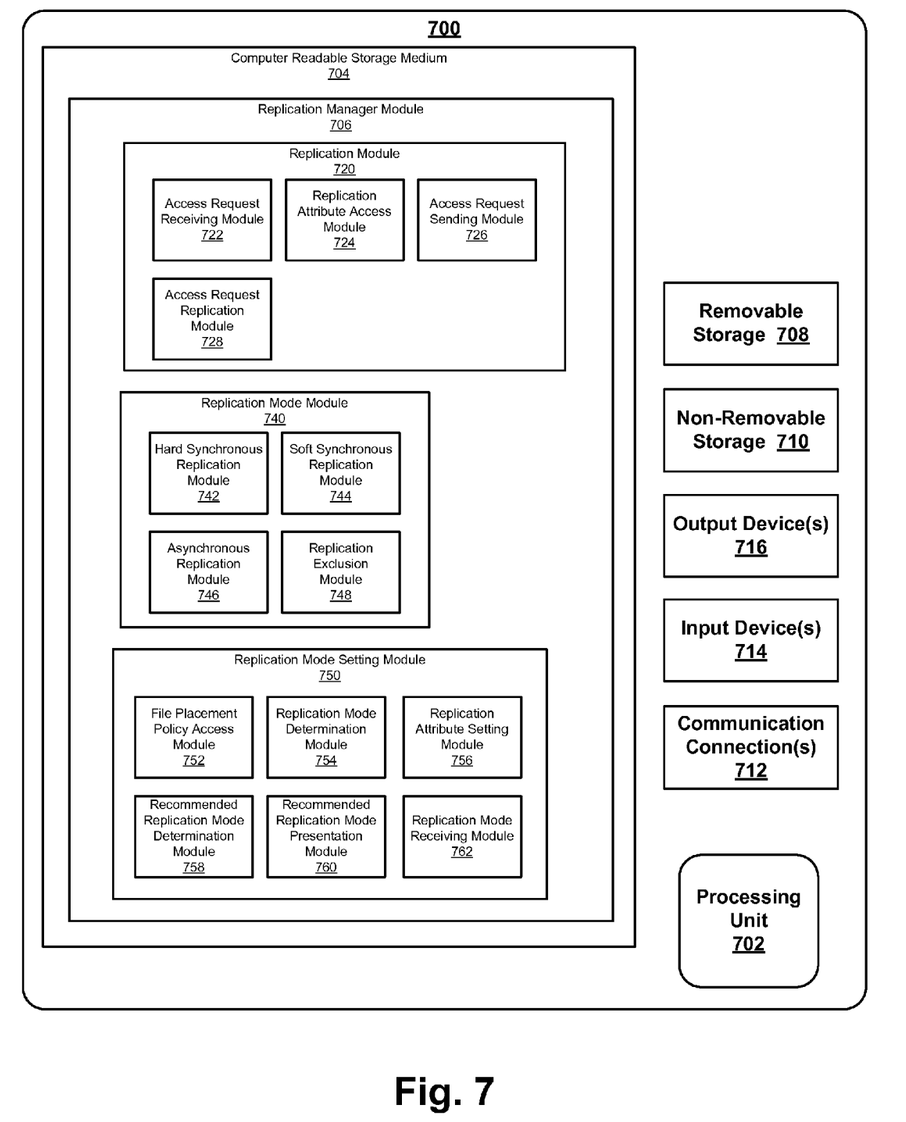
FIG. 7 shows a block diagram of exemplary computer system and corresponding modules, in accordance with one embodiment of the present invention.

FIG. 7 illustrates example components used by various embodiments of the present invention. Although specific components are disclosed in system 700, it should be appreciated that such components are examples. That is, embodiments of the present invention are well suited to having various other components or variations of the components recited in system 700. It is appreciated that the components in system 700 may operate with other components than those presented, and that not all of the components of system 700 may be required to achieve the goals of system 700.

FIG. 7 shows a block diagram of an exemplary computer system and corresponding modules, in accordance with one embodiment of the present invention. With reference to FIG. 7, an exemplary system module for implementing embodiments includes a general purpose computing system environment, such as computing system environment 700. Computing system environment 700 may include, but is not limited to, servers (e.g., server 106), desktop computers, laptops, tablet PCs, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed optimize replication (e.g., processes 500-600). In one embodiment, computer readable storage medium 704 is a non-transitory computer readable medium.

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

In one embodiment, computer readable storage medium 704 includes replication manager module 706 which includes replication module 720, replication mode module 740, and replication mode setting module 750.

Replication module 720 includes access request receiving module 722, replication attribute access module 724, access request sending module 726, and access request replication module 728. Access request receiving module 722 is operable to receive an access request (e.g., read or write request) for a portion of storage. Replication attribute access module 724 is operable to access a replication attribute corresponding to a tier containing a storage portion associated with an access request. The replication attribute corresponds to a replication mode for the tier. Access request sending module 726 is operable to send an access request to the tier for performance of the read/write operation. Access request replication module 728 is operable to replicate an access request to a remote storage based on the replication mode for the tier.

Replication mode module 740 includes hard synchronous replication module 742, soft synchronous replication module 744, asynchronous replication module 746, and replication exclusion module 748. Hard synchronous replication module 742 is operable to send an acknowledgement to an application after the access request is completed on the remote storage thereby ensure local and remote storage are synchronous in time. Soft synchronous replication module 744 is operable to send an acknowledgement to an application while a size of the access request and a plurality of previous access requests are less than a predetermined size limit. Soft synchronous replication module 744 is further operable to send an acknowledgement to an application while a number of pending access requests to the remote storage is less than a predetermined number of access requests. Asynchronous replication module 746 is operable to send an acknowledgement to an application after the access request is sent to the remote storage. Replication exclusion module 748 is operable to exclude the portion of storage from replication on the remote storage.

Replication mode setting module 750 includes file placement policy access module 752, replication mode determination module 754, replication attribute setting module 756, recommended replication mode determination module 758, recommended replication mode presentation module 760, replication mode receiving module 762. File placement policy access module 752 is operable to access a file placement policy (e.g., corresponding to a storage tiering system). Replication mode determination module 754 is operable to automatically determine a replication mode for each tier (e.g., automatically based on information within the file placement policy or based on file access frequency). Replication attribute setting module 756 is operable to set a replication attributes for the tiers. Recommended replication mode determination module 758 is operable to recommend a replication mode (e.g., based on frequency of access or a file placement policy). Recommended replication mode presentation module 760 is operable to present (e.g., via GUI or CLI) a user with recommend replication modes. Replication mode receiving module 762 is operable to receive a replication mode (e.g., via GUI or CLI) and send the replication mode to replication attribute setting module 756.

Figure 8:
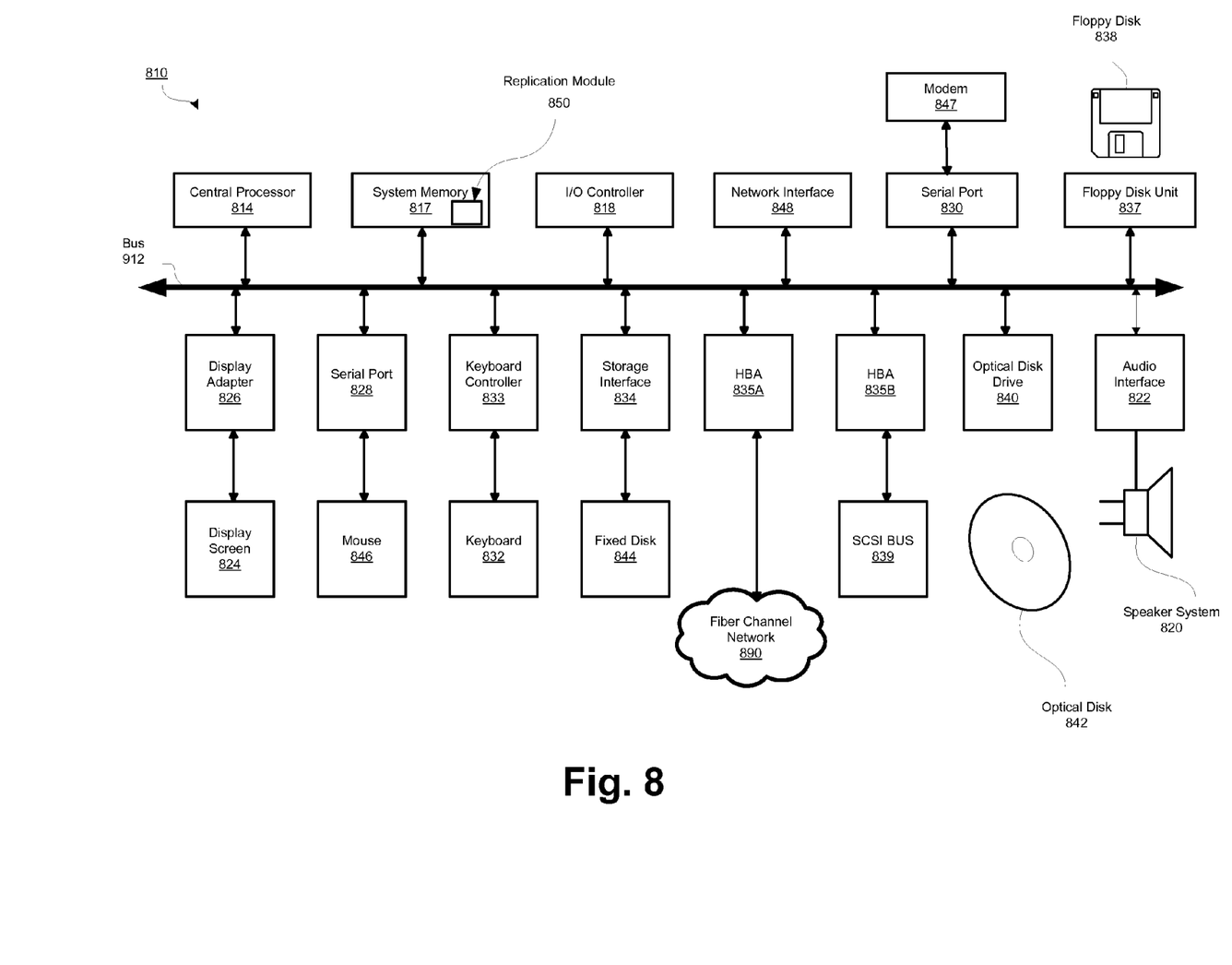
FIG. 8 shows a block diagram of another exemplary computer system, in accordance with one embodiment of the present invention.

FIG. 8 shows a block diagram of another exemplary computer system, in accordance with one embodiment of the present invention. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). System memory 817 includes replication module 850 which is operable to optimize replication thereby saving bandwidth and storage involved in replication.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a system and method for optimizing replication using tier-specific replication modes associated with different tiers of a storage system. In one embodiment, replication is optimized by selectively performing replication thereby saving bandwidth and reducing storage requirements at one or more remote sites. Embodiments of the present invention are operable to distinguish the relative priorities of portion of storage and thereby exclude non-critical data from replication or modify replication modes.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for optimizing replication comprising:
receiving, within an electronic system having a plurality of tiers, an access request for a portion of storage associated with a first tier of said plurality of tiers;
accessing a replication attribute corresponding to said first tier, wherein said replication attribute specifies a replication mode associated with said first tier and said portion of storage, wherein said replication mode comprises one of a synchronous and an asynchronous type;
sending said access request to said portion of storage, wherein access to said portion of storage is performed based upon said access request; and
replicating said access request to a remote storage, wherein replication of said access request is performed on said remote storage based on said replication mode, and wherein each of said plurality of tiers have associated therewith a respective replication attribute defining a respective replication mode.

2. The method of claim 1 wherein said replication mode comprises:
sending an acknowledgement to an application after said access request is completed on said remote storage.

3. The method of claim 1 wherein said replication mode comprises:
sending an acknowledgement after said access request is sent to said remote storage.

4. The method of claim 1 wherein said replication mode comprises:
sending an acknowledgement while a size of said access request and a plurality of previous access requests are less than a predetermined size limit.

5. The method of claim 1 wherein said replication mode comprises:
excluding said portion of storage from replication on said remote storage.

6. The method of claim 1 further comprising:
accessing a file placement policy associated with said plurality of tiers;
automatically determining said replication mode for said first tier based on specifications within said file placement policy that involve said first tier; and
associating said replication attribute with said first tier.

7. The method of claim 1 further comprising:
accessing a file placement policy associated with said plurality of tiers;
automatically determining a respective replication mode for each of said plurality of tiers based on said file placement policy; and
associating a respective replication attribute with each tier of said plurality of tiers based on a determined respective replication mode for each tier.

8. The method of claim 7 wherein said automatically determining comprises examining numbers of files that are associated with each tier of said plurality of tiers.

9. A non-transitory computer readable storage medium having stored thereon computer executable instructions that, if executed by a computer system, cause the computer system to perform a method for optimizing replication comprising:
receiving, within an electronic system having a plurality of tiers, an access request for a portion of storage located in a first tier of said plurality of tiers;
accessing a first replication attribute corresponding to said first tier, wherein said first replication attribute specifies a first replication mode associated with said first tier and said portion of storage, wherein said first replication mode comprises one of a synchronous and an asynchronous type;
sending said access request to said portion of storage, wherein access to said portion of storage is performed based upon said access request; and
initiating a replication of said access request to a remote storage, wherein said replication is performed on said remote storage based on said first replication mode, and wherein each of said plurality of tiers have associated therewith a respective replication attribute defining a respective replication mode.

10. The non-transitory computer readable storage medium of claim 9, wherein said first replication mode comprises:
sending an acknowledgement to an application after said access request is completed on a remote portion of storage.

11. The non-transitory computer readable storage medium of claim 9, wherein said first replication mode comprises:
sending an acknowledgement after said access request is sent to said remote storage.

12. The non-transitory computer readable storage medium of claim 9, wherein said first replication mode comprises:
sending an acknowledgement while a size of said access request and a plurality of previous access requests are less than a predetermined size limit.

13. The non-transitory computer readable storage medium of claim 9, wherein said first replication mode comprises:
excluding said portion of storage from replication on said remote storage.

14. The non-transitory computer readable storage medium of claim 9, wherein said method further comprises:
accessing a file placement policy associated with said plurality of tiers;
automatically determining said first replication mode based on specifications within said file placement policy that involve said first tier; and
associating said first replication attribute with said first tier.

15. A storage system, comprising:
a plurality of tiers;
a computer system comprising one or more processors coupled to a computer readable storage media and configurable to execute computer readable code stored on the computer readable storage media which causes the computer system to implement a method comprising:
accessing information related to said plurality of tiers;
based on said information, associating a respective replication mode with each tier of said plurality of tiers;
storing each respective replication mode associated with each tier;
sending an access request to a portion of storage associated with a first tier of said plurality of tiers, wherein access to said portion of storage is performed based upon said access request; and
initiating a replication of said access request to a remote storage, wherein said replication is performed on said remote storage based on a first replication mode associated with said first tier, wherein said first replication mode comprises one of a synchronous and an asynchronous type.

16. The storage access system of claim 15, wherein said first replication mode is selected from the set comprising:
hard synchronous mode;
soft synchronous mode;
asynchronous mode; and
no replication mode.

17. The storage access system of claim 15 wherein said information related to said plurality of tiers is user specified.

18. The storage access system of claim 15 wherein said information related to said plurality of tiers comprise a file placement policy associated with said plurality of tiers and wherein further said associating a respective replication mode with each tier comprises:
accessing said file placement policy;
automatically determining a respective replication mode for each tier of said plurality of tiers based on said file placement policy; and
associating a respective replication mode with each tier of said plurality of tiers based on said automatically determining.

19. The storage access system of claim 18 wherein said automatically determining comprises determining numbers of files associated with each tier of said plurality of tiers.

20. The storage access system of claim 18 wherein said method further comprises:
rendering a graphical user interface in which respective replication modes associated with said plurality of tiers are user modifiable.

* * * * *